(12) United States Patent
Lee et al.

(10) Patent No.: US 8,592,082 B2
(45) Date of Patent: Nov. 26, 2013

(54) ELECTRODE ASSEMBLY AND SECONDARY BATTERY HAVING THE SAME

(75) Inventors: Chanho Lee, Yongin-si (KR); Kiwoon Kim, Yongin-si (KR); Young Ju Ahn, Yongin-si (KR); Jinho Lee, Yongin-si (KR); Junpyo Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/552,589

(22) Filed: Jul. 18, 2012

(65) Prior Publication Data

US 2013/0196226 A1    Aug. 1, 2013

(30) Foreign Application Priority Data

Jan. 30, 2012 (KR) .................. 10-2012-0009265

(51) Int. Cl.
*H01M 4/02* (2006.01)
(52) U.S. Cl.
USPC ........... 429/211; 429/145; 429/232; 429/235; 429/236
(58) Field of Classification Search
USPC ............... 429/211, 239, 240, 218.2–231.95, 429/232–238, 133, 145
See application file for complete search history.

(56) References Cited

U.S. PATENT DOCUMENTS

| 2001/0012588 A1* | 8/2001 | Kaido et al. ............... 429/233 |
| 2004/0170895 A1* | 9/2004 | Takeuchi et al. .......... 429/218.1 |
| 2007/0048615 A1 | 3/2007 | Nagayama et al. |
| 2009/0191461 A1* | 7/2009 | Nakamura ................. 429/209 |

FOREIGN PATENT DOCUMENTS

| JP | 2004-303484 A | 10/2004 |
| JP | 2007-059230 A | 3/2007 |
| JP | 2011-029136 A | 2/2011 |
| WO | WO2011074098 | * 7/2011 |

OTHER PUBLICATIONS

David Linden, Handbook of Batteries, 2002, McGraw-Hill, 3rd Edition, Chapter 2.5.2, p. 54-55.*
English Machine Translation of JP 2004-303484, 11 pages.
English Machine Translation of JP 2011-029136, 22 pages.

* cited by examiner

*Primary Examiner* — Raymond Alejandro
*Assistant Examiner* — Jimmy K Vo
(74) *Attorney, Agent, or Firm* — Christie, Parker & Hale, LLP

(57) ABSTRACT

A secondary battery includes an electrode assembly, which has improved safety by reducing a density of an active material centrally positioned in the electrode assembly. In the secondary battery, an electrode assembly includes a first electrode plate, a second electrode plate and a separator between the first electrode plate and the second electrode plate, the first electrode plate including a first electrode current collector and a first active material layer on the first electrode current collector, the first active material layer including a first active material, a binder and a conductive agent, and a portion of the first active material layer at a central portion of the electrode assembly including the first active material at a lower density than a density of the first active material at a portion of the first active material layer at a peripheral portion of the electrode assembly.

17 Claims, 6 Drawing Sheets

ELECTRODE ASSEMBLY AND SECONDARY BATTERY HAVING THE SAME

CROSS-REFERENCE TO RELATED APPLICATION

This application claims priority to and the benefit of Korean Patent Application No. 10-2012-0009265, filed in the Korean Intellectual Property Office on Jan. 30, 2012, the entire content of which is incorporated herein by reference.

BACKGROUND

1. Field

Embodiments of the present invention relate to a secondary battery having an electrode assembly.

2. Description of the Related Art

Unlike primary batteries which are not designed to be recharged, secondary batteries can be repeatedly charged and discharged. Low capacity batteries that use single battery cells are used as power sources for various small portable electronic devices such as cellular phones, and camcorders. High power batteries that use tens of battery cells connected to each other in a battery pack are used as power sources for electric scooters, and hybrid electric vehicles (HEV).

A secondary battery employed in an automotive vehicle requires a high capacity and is gradually getting bulky, unlike the conventional low-capacity secondary battery used with a small-sized electronic device. A prismatic battery may have a difference in the heat dissipation between the inside and the outside of a cell due to an increase in the thickness, making it difficult to attain improved safety. In particular, in a high power secondary battery having a plurality of battery cells in a jelly roll configuration for use in HEV, there is a considerable temperature difference between a central cell and a peripheral cell. In addition, when penetration or internal short circuit occurs, the temperature of the central cell may be excessively increased. Thus, there may be a high potential for thermal runaway, resulting in fire or explosion.

SUMMARY

Aspects of embodiments of the present invention are directed toward a secondary battery including an electrode assembly, which has improved safety by reducing a density of an active material centrally positioned in the electrode assembly.

According to an embodiment of the present invention, a secondary battery includes an electrode assembly including a first electrode plate, a second electrode plate, and a separator between the first electrode plate and the second electrode plate wound together, wherein the first electrode plate includes a first electrode current collector and a first active material layer on the first electrode current collector, the first active material layer comprising a first active material, a binder and a conductive agent, and wherein a portion of the first active material layer at a central portion of the electrode assembly includes the first active material at a lower density than a density of the first active material at a portion of the first active material layer at a peripheral portion of the electrode assembly.

The portion of the first active material layer at the central portion of the electrode assembly may include the first active material at a smaller concentration than that of the portion of the first active material layer at the peripheral portion of the electrode assembly.

The portion of the first active material layer at the central portion of the electrode assembly may include a higher combined concentration of the binder and the conductive agent than that of the portion of the first active material layer at the peripheral portion of the electrode assembly.

The portion of the first active material layer at the central portion of the electrode assembly and the portion of the first active material layer at the peripheral portion of the electrode assembly may each have pores, the portion of the first active material layer at the central portion of the electrode assembly having a larger amount of pores than the portion of the first active material layer at the peripheral portion of the electrode assembly, and the pores may be formed by a foaming agent.

The first active material layer may include a larger particle size of the first active material at the central portion of the electrode assembly than at the peripheral portion of the electrode assembly.

The first active material layer may have a leading edge positioned at one end of the first electrode plate, corresponding to the central portion of the electrode assembly, a terminal edge positioned at the other end of the first electrode plate, corresponding to the peripheral portion of the electrode assembly, and the density of the first active material of the first active material layer may gradually increase from the leading edge to the terminal edge.

The first active material layer may be divided into a plurality of sections, including a first section, a second section, a third section and a fourth section sequentially arranged from the central portion of the electrode assembly to the peripheral portion of the electrode assembly, a density of the first active material in the first section may be lower than a density of the first active material in the second section, the density of the first active material in the second section may be lower than a density of the first active material in the third section, and the density of the first active material in the third section may be lower than a density of the first active material in the fourth section.

A concentration of the first active material in the first section may be smaller than a concentration of the first active material in the second section, the concentration of the first active material in the second section may be smaller than a concentration of the first active material in the third section, and the concentration of the first active material in the third section may be smaller than a concentration of the first active material in the fourth section.

A particle size of the first active material in the first section may be larger than a particle size of the first active material in the second section, the particle size of the first active material in the second section may be larger than a particle size of the first active material in the third section, and the particle size of the first active material in the third section may be larger than a particle size of the first active material in the fourth section.

The second electrode plate may include a second electrode current collector and a second active material layer on at least one surface of the second electrode current collector, the second active material layer having a uniform thickness and including a second active material, a binder and a conductive agent, and the portion of the second active material layer at the central portion of the electrode assembly may include the second active material at a lower density than a density of the second active material at the portion of the second active material layer at the peripheral portion of the electrode assembly.

The second active material layer may have a smaller concentration of the second active material at the central portion of the electrode assembly than a concentration of the second active material at the peripheral portion of the electrode assembly.

The second active material layer may have a higher combined concentration of the binder and the conductive agent at the central portion of the electrode assembly than a combined concentration of the binder and the conductive agent at the peripheral portion of the electrode assembly.

The portion of the second active material layer at the central portion of the electrode assembly and the portion of the second active material layer at the peripheral portion of the electrode assembly each have pores, the portion of the second active material layer at the central portion of the electrode assembly having a larger amount of the pores than the portion of the first active material layer at the peripheral portion of the electrode assembly, and the pores may be formed by a foaming agent.

The second active material layer may include a larger particle size of the first active material at the central portion of the electrode assembly than at the peripheral portion of the electrode assembly.

The second active material layer may have a leading edge positioned at one end of the second electrode plate, corresponding to the central portion of the electrode assembly, and a terminal edge positioned at the other end of the second electrode plate, corresponding to the peripheral portion of the electrode assembly, and the density of the second active material of the second active material layer may gradually increase from the leading edge to the terminal edge.

The second active material layer may be divided into a plurality of sections, including a first section, a second section, a third section and a fourth section sequentially arranged from the central portion of the electrode assembly to the peripheral portion of the electrode assembly, and a density of the second active material in the first section may be lower than a density of the second active material in the second section, the density of the second active material in the second section may be lower than a density of the second active material in the third section, and density of the second active material in the third section may be lower than a density of the second active material in the fourth section.

A particle size of the second active material in the first section may be larger than a particle size of the second active material in the second section, the particle size of the second active material in the second section may be larger than a particle size of the second active material in the third section, and the particle size of the second active material in the third section may be larger than a particle size of the second active material in the fourth section.

As described above, in the electrode assembly and the secondary battery having the same according to an embodiment of the present invention, an active material layer at a central portion of the electrode assembly has a lower density of an active material than a density of an active material of the active material layer at a peripheral portion of the electrode assembly, thereby improving safety while reducing a risk of fire or explosion even when penetration or internal short circuit occurs.

Additional aspects and/or advantages of the invention will be set forth in part in the description which follows and, in part, will be obvious from the description, or may be learned by practice of the invention.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
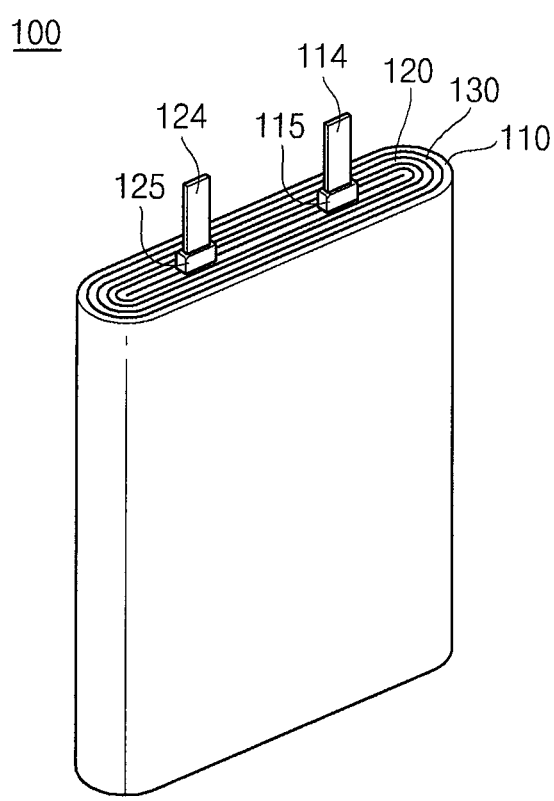
FIG. 1 is a perspective view illustrating an electrode assembly according to an embodiment of the present invention which has been wound.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

Figure 2:
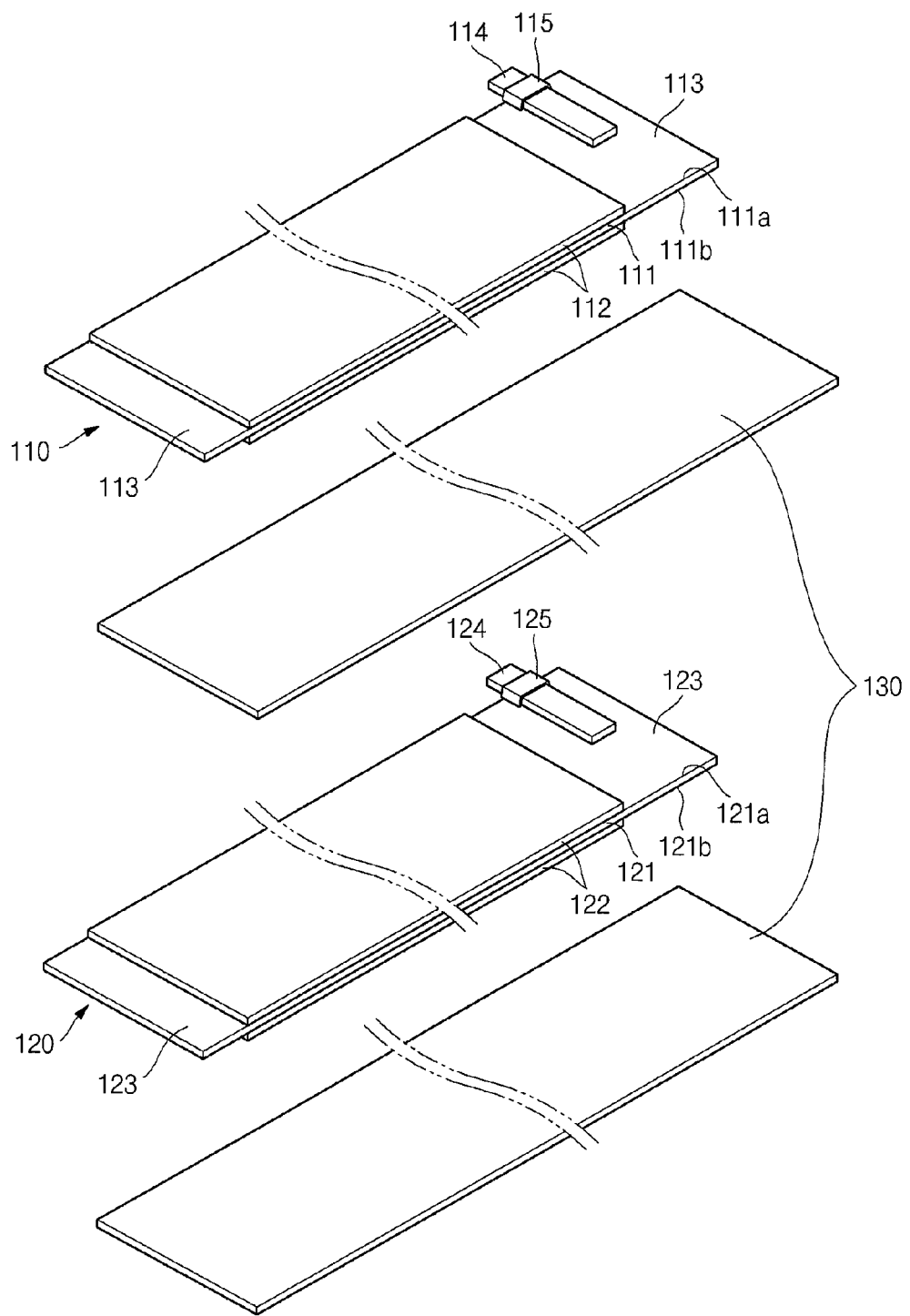
FIG. 2 is an exploded perspective view illustrating an embodiment of the present invention in which the electrode assembly shown in FIG. 1 has yet to be wound.

FIG. 1 is a perspective view illustrating an electrode assembly according to an embodiment of the present invention which has been wound, and FIG. 2 is an exploded perspective view illustrating a state in which the electrode assembly shown in FIG. 1 has yet to be wound.

Referring to FIGS. 1 and 2, the electrode assembly 100 according to an embodiment of the present invention includes a first electrode plate 110, a second electrode plate 120 and a separator 130. The electrode assembly 100 is formed by winding a stacked structure having the first electrode plate 110, the separator 130 and the second electrode plate 120. Here, the first electrode plate 110 may function as a positive electrode and the second electrode plate 120 may function as a negative electrode, or vice versa. The following description will be made assuming that the first electrode plate 110 functions as a positive electrode and the second electrode plate 120 functions as a negative electrode, but the present invention is not limited thereto.

The first electrode plate 110 includes a first electrode current collector 111, a first active material layer 112, a first uncoated portion 113, a first electrode tab 114 and a first insulation member 115.

The first electrode current collector 111 has a first surface 111a that is substantially planar and a second surface 111b that is opposite to the first surface 111a and is substantially planar. The first electrode current collector 111 is made of a highly conductive metal thin film to collect electrons from the first active material layer 112 and move the collected electrons outside of the electrode assembly, for example, the first electrode current collector 111 may be an aluminum (Al) foil. The first active material layer 112 may be formed on the first and second surfaces 111a and 111b of the first electrode current collector 111. With respect to the first electrode current collector 111, a portion without the first active material layer 112 is referred to as a first uncoated portion 113.

In one embodiment, the first active material layer 112 is coated on the first and second surfaces 111a and 111b of the first electrode current collector 111 to a uniform thickness. In addition, in one embodiment, the first active material layer 112 is coated on a predetermined (or preset) region of the first electrode current collector 111 to the same thickness. That is to say, the first active material layer 112 is in a region other than the first uncoated portion 113 to which a first electrode tab 114 is attached. In one embodiment, the first active material layer 112 is formed by mixing a first active material with a conductive material such as carbon black or graphite powder and a binder for fixing the first active material. Here, the first active material may include chalcogenide compounds, and examples thereof may include, but are not limited to, composite metal oxides such as $LiCoO_2$, $LiMn_2O_4$, $LiNiO_2$, or $LiNiMnO_2$. In addition, in one embodiment, the first active material layer 112 has a lower density at a central portion of the electrode assembly 100 than at a peripheral portion of the electrode assembly 100. Therefore, the first active material layer 112 can minimize or reduce heat generation by the first active material in the central portion of the electrode assembly 100, which will be described in more detail below.

The first uncoated portion 113 refers to a portion of the first electrode current collector 111, where the first active material layer 112 is not formed, and may be located at both ends of the first electrode current collector 111. The first uncoated portion 113 becomes a path of current flow between the first electrode plate 110 and outside of the electrode assembly. The first electrode tab 114 is located at the first uncoated portion 113.

One end of the first electrode tab 114 is electrically connected to the first uncoated portion 113 and the other end thereof protrudes to the outside of the electrode assembly. Here, for example, the first electrode tab 114 may be welded to the first uncoated portion 113. In addition, a first insulation member 115 may be attached to the first electrode tab 114.

In one embodiment, the first insulation member 115 is attached to the first electrode tab 114 to prevent (or protect) the first electrode tab 114 from being shorted to the second electrode plate 120 having a different polarity from the first electrode tab 114 when the first electrode plate 110 is wound.

In one embodiment, the second electrode plate 120 includes a second electrode current collector 121, a second active material layer 122, a second uncoated portion 123, a second electrode tab 124 and a second insulation member 125.

The second electrode current collector 121 has a first surface 121a that is substantially planar and a second surface 121b that is opposite to the first surface 121a and is substantially planar. The second electrode current collector 121 is made of a highly conductive metal thin film to collect electrons from the second active material layer 122 and move the collected electrons outside of the electrode assembly, for example, the second electrode current collector 121 may be a copper (Cu) or nickel (Ni) foil. The second active material layer 122 may be on the first and second surfaces 121a and 121b of the second electrode current collector 121. With respect to the second electrode current collector 121, a portion without the second active material layer 122 is referred to as a second uncoated portion 123.

In one embodiment, the second active material layer 122 is coated on the first and second surfaces 121a and 121b of the second electrode current collector 121 to a uniform thickness. In addition, in one embodiment, the second active material layer 122 is coated on a predetermined (or preset) region of the second electrode current collector 121 to the same thickness. That is to say, the second active material layer 122 is in a region other than the second uncoated portion 123 to which a second electrode tab 124 is attached. In one embodiment, the second active material layer 122 is formed by mixing a second active material with a conductive material such as carbon black or graphite powder and a binder for fixing the second active material. Here, the second active material may include, but is not limited to, a carbonaceous material, Si, Sn, tin oxide, a tin oxide composite, a transition metal oxide, lithium metal nitride or lithium metal oxide. In addition, in one embodiment, the second active material layer 122 has a lower density at the central portion of the electrode assembly 100 than at the peripheral portion of the electrode assembly 100. Therefore, the second active material layer 122 can minimize or reduce heat generation by the second active material in the central portion of the electrode assembly 100. Because the second active material layer 122 is substantially the same as the first active material layer 112 except for active material types, further detailed description thereof will be omitted.

The second uncoated portion 123 refers to a portion of the second electrode current collector 121, where the second active material layer 122 is not formed, and it may be located at both ends of the second electrode current collector 121. The second uncoated portion 123 becomes a path of current flow between the second electrode plate 120 and outside of the electrode assembly. The second electrode tab 124 is located at the second uncoated portion 123.

One end of the second electrode tab 124 is electrically connected to the second uncoated portion 123 and the other end thereof protrudes outside of the electrode assembly. Here, for example, the second electrode tab 124 may be welded to the second uncoated portion 123. In addition, a second insulation member 125 may be attached to the second electrode tab 124.

In one embodiment, the second insulation member 125 is attached to the second electrode tab 124 to prevent (or protect) the second electrode tab 124 from being shorted to the first electrode plate 110 having a different polarity from the second electrode tab 124 when the second electrode plate 120 is wound.

The separator 130 is between the first electrode plate 110 and the second electrode plate 120 to prevent a short circuit from occurring between the first electrode plate 110 and the second electrode plate 120, or to protect from such a short circuit, while allowing lithium ions to move therebetween. The separator 130 may be made of polyethylene, polypropylene or a composite film of polyethylene and polypropylene, but it is not limited thereto.

In general, the electrode assembly is formed by winding a first electrode plate, a second electrode plate and a separator between the first electrode plate and the second electrode plate in a jelly-roll configuration. The electrode assembly wound in a jelly-roll configuration has lower heat transfer efficiency at its central portion than at its peripheral portion. Therefore, when heat is generated due to penetration or internal short circuit, a temperature of the central portion of the electrode assembly may become higher than that of the peripheral portion, and there is a great potential for thermal runaway, which may result in fire and explosion.

However, in the electrode assembly 100 according to an embodiment of the present invention, since an active material has a lower density at the central portion of the electrode assembly 100 than at the peripheral portion of the electrode assembly 100, heat generation by the first active material in the central portion of the electrode assembly 100 can be reduced. Accordingly, the electrode assembly 100 according to an embodiment of the present invention can reduce a temperature surge at the central portion of the electrode assembly, in which heat transfer efficiency is relatively low, and can improve safety of the electrode assembly 100 when heat is generated due to penetration or internal short circuit.

Next, a density of the first active material layer 112 will be described. In one embodiment of the present invention, the first active material layer 112 and the second active material layer 122 are substantially the same in view of thickness and density, except the components of each active material may be different. The following description will focus on the first active material layer 112.

Figure 3:
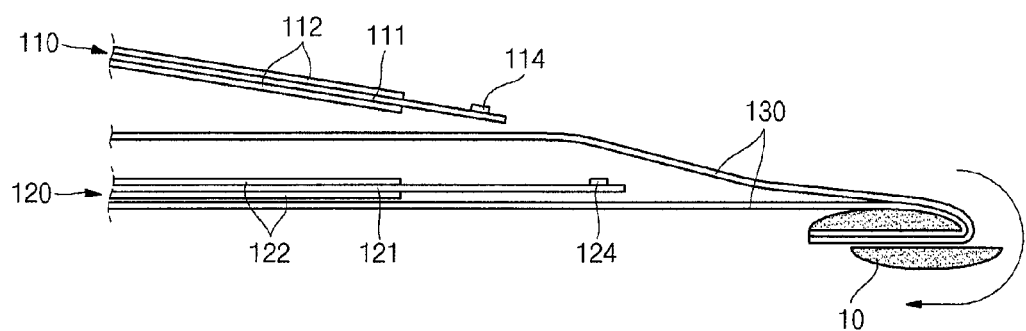
FIG. 3 is a cross-sectional view illustrating the electrode assembly shown in FIG. 1 as it is being wound.
Figure 4:
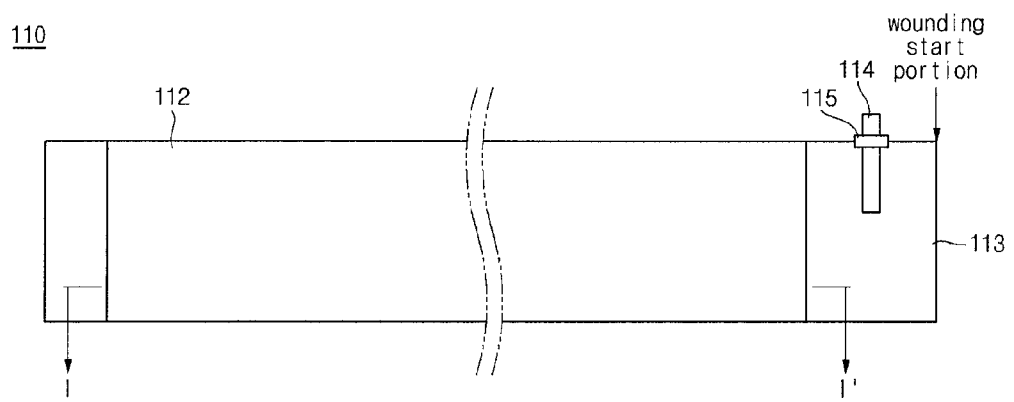
FIG. 4 is a plan view illustrating a first electrode plate in the electrode assembly shown in FIG. 1.
Figure 5A:
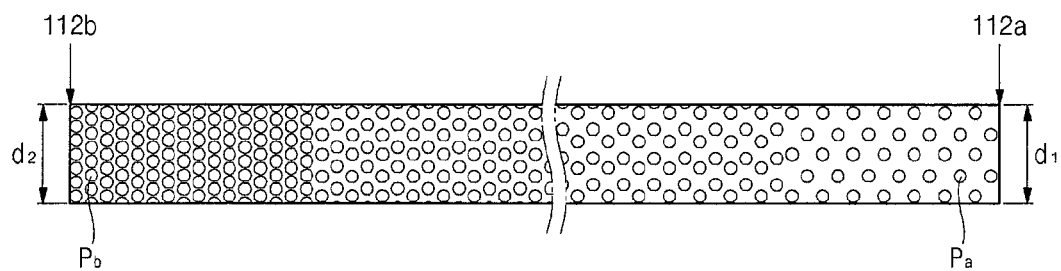
FIGS. 5A and 5B are cross-sectional side views taken along the line I-I' of FIG. 4.
Figure 5B:
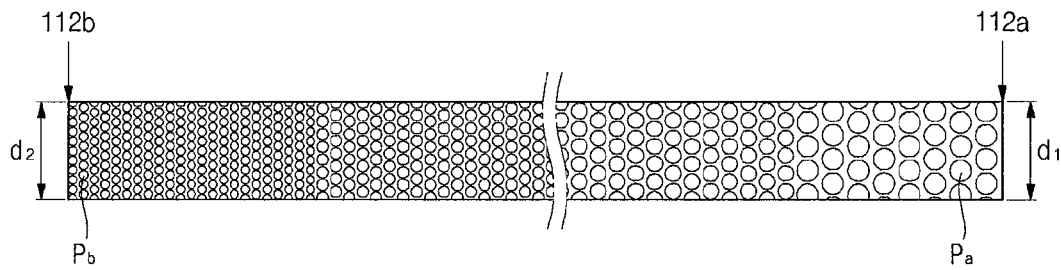

FIG. 3 is a cross-sectional view illustrating the electrode assembly shown in FIG. 1 as it is being wound, FIG. 4 is a plan view illustrating a first electrode plate in the electrode assembly shown in FIG. 1, and FIGS. 5A and 5B are cross-sectional side views taken along the line I-I' of FIG. 4.

Referring to FIGS. 3 and 4, a part of the separator 130 is first wound around a mandrel 10. Then, the first electrode plate 110 and the second electrode plate 120 are arranged with the separator 130 therebetween and wound together with the separator 130. Here, the first electrode plate 110 and the second electrode plate 120 are wound first from their respective uncoated portions 113 and 123 with the first electrode tab 114 and the second electrode tab 124 attached thereto, respectively. Here, the first active material layer 112 and the second active material layer 122 are wound together when the first electrode plate 110 and the second electrode plate 120 are wound. In one embodiment, of two ends of the first active material layer 112, the first wound end is defined as a leading edge 112a and the last wound end is defined as a terminal edge 112b. In one embodiment, the leading edge 112a of the first active material layer 112 is positioned at the central portion of the electrode assembly 100 and the terminal edge 112b of the first active material layer 112 is positioned at the peripheral portion of the electrode assembly 100.

Referring to FIGS. 4 to 5B, in one embodiment, the first active material layer 112 is formed to have the same thickness from the leading edge 112a to the terminal edge 112b (d1=d2). The first active material layer 112 includes a first active material, a conductive material and a binder. In the illustrated embodiment, when a cross section of the first active material layer 112 is illustrated with first active material particles $P_a$ and $P_b$, and the first active material is filled with the conductive material and the binder. In addition, the first active material layer 112 has different densities of the first active material in the leading edge (e.g., 112a) and the terminal edge (e.g., 112b). That is to say, in one embodiment of the electrode assembly, the first active material layer 112 has a lower density of the first active material positioned at the central portion of the electrode assembly 100 than at the peripheral portion of the electrode assembly 100.

For example, in one embodiment, the first active material layer 112 includes the first active material having densities gradually increasing from the leading edge 112a to the terminal edge 112b.

As shown in FIG. 5A, the first active material layer 112 has a lower density of the first active material in the leading edge (e.g., 112a) than in the terminal edge (e.g., 112b).

First, in one embodiment, the first active material layer 112 is formed such that a smaller concentration (or amount) of the first active material is at the leading edge than at the terminal edge, thereby making a density of the first active material at the central portion of the electrode assembly 100 lower than that of the first active material at the peripheral portion of the electrode assembly 100. For example, in this embodiment, a particle size $P_a$ of the first active material at the leading edge is equal to a particle size $P_b$ of the first active material at the terminal edge ($P_a=P_b$). In addition, the first active material layer 112 has a higher combined concentration (or combined amount) of the binder and the conductive agent (e.g., the concentration or amount of the binder and conductive agent together) at the leading edge than at the terminal edge, thereby making a density of the first active material at the central portion of the electrode assembly 100 lower than that of the first active material at the peripheral portion of the electrode assembly 100. For example, the first active material layer 112 at the leading edge may include 90% of the first active material, 5% of the conductive material and 5% of the binder, and the first active material layer 112 at the terminal edge may include 96% of the first active material, 2% of the conductive material and 2% of the binder. By reducing the concentration (or amount) of the first active material in the first active material layer 112, the concentration (or amount) of the conductive material and the binder can be relatively increased. Thus, reducing the concentration (or amount) of the first active material at the leading edge may have the same effect as increasing the concentration (or amount) of the conductive material and the binder.

Additionally, the first active material layer 112 may include a foaming agent, and a concentration (or amount) of the foaming agent at the leading edge may be larger than that of the foaming agent at the terminal edge. In one embodiment, the foaming agent is used to form pores in the first active material layer 112. For example, in one embodiment, the first active material layer 112 has a larger amount of pores at the leading edge than at the terminal edge. Therefore, the first active material layer 112 is formed such that a larger amount of pores is formed at the leading edge than at the terminal edge, thereby making a density of the first active material at the central portion of the electrode assembly 100 lower than that of the first active material at the peripheral portion of the electrode assembly 100.

In addition, as shown in FIG. 5A, in one embodiment, the first active material layer 112 is formed such that the first active material has a larger particle size in the leading edge than in the terminal edge ($P_a>P_b$), thereby making a density of the first active material at the central portion of the electrode assembly 100 lower than that of the first active material at the peripheral portion of the electrode assembly 100. If the particle size $P_a$ of the first active material at the leading edge is larger than the particle size $P_b$ of the first active material at the terminal edge, the pores at the leading edge are relatively increased, thereby lowering the density of the first active material at the leading edge.

Another embodiment of the first electrode plate will now be described.

Figure 6:
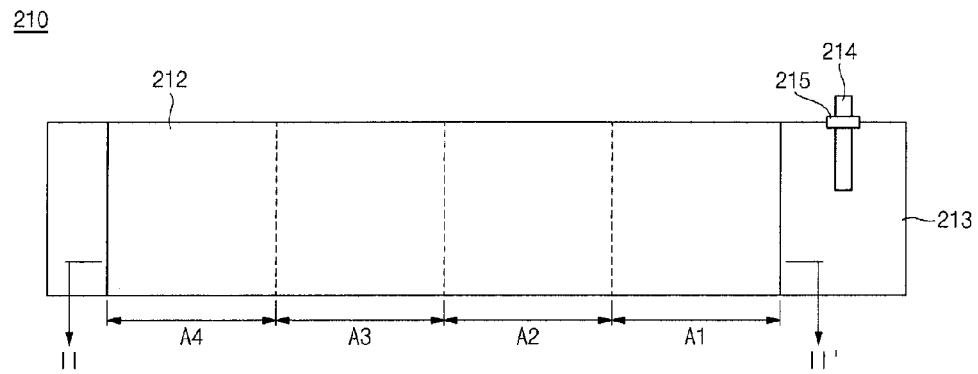
FIG. 6 is a plan view illustrating a second electrode plate according to another embodiment of the present invention.
Figure 7A:
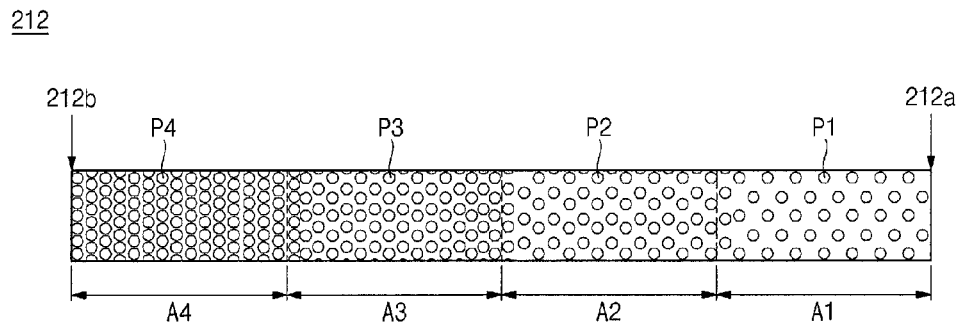
FIGS. 7A and 7B are cross-sectional side views taken along the line II-II' of FIG. 6.
Figure 7B:
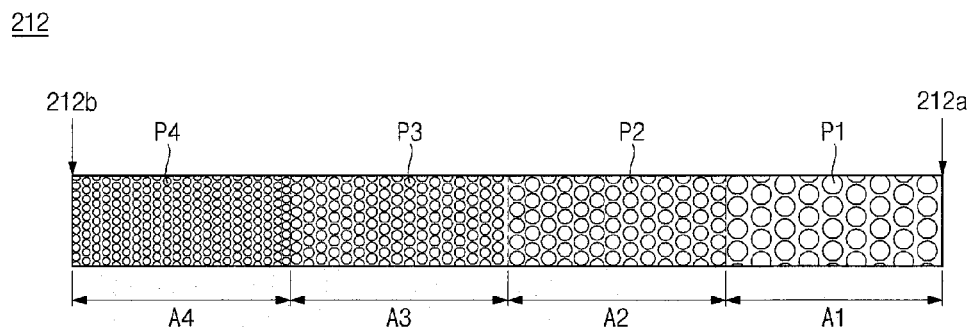

FIG. 6 is a plan view illustrating a second electrode plate according to another embodiment of the present invention, and FIGS. 7A and 7B are cross-sectional side views taken along the line II-II' of FIG. 6.

Referring to FIG. 6, the first electrode plate 210 includes a first electrode current collector 211, a first active material layer 212, a first uncoated portion 213, a first electrode tab 214 and a first insulation member 215. Here, the first electrode current collector 211, the first uncoated portion 213, the first electrode tab 214 and the first insulation member 215 are same as the first electrode current collector 111, the first uncoated portion 113, the first electrode tab 114 and the first insulation member 115, which are shown in FIG. 4, respectively, and, therefore, further detailed description thereof will be omitted.

As described above, in the first active material layer 212, the first wound end is defined as a leading edge 212a and the last wound end is defined as a terminal edge 212b. The first active material layer 212 is divided into a plurality of sections. As shown in FIG. 6, the first active material layer 212 is divided into a first section A1, a second section A2, a third section A3 and a fourth section A4 from its leading edge 212a to the terminal edge 212b. In the illustrated embodiment of the present invention, the first active material layer 212 is divided into 4 sections, but it is not limited thereto. The first active material layer 212 may be divided into a smaller or larger number of sections.

Referring to FIGS. 7A and 7B, in these embodiments, the first active material layer 212 is formed to have the same thickness from the leading edge 212a to the terminal edge 212b (d1=d2; see FIGS. 5A and 5B). That is to say, the first active material layer 212 is formed in the first section to the fourth section to a uniform thickness. The first active material layer 212 includes a first active material, a conductive material and a binder. In addition, the first active material layer 212 is formed to have different densities of the first active material in the first section through the fourth section, and, in one embodiment, densities of the first active material gradually increase from the first section to the fourth section. That is to say, in this embodiment, the first active material layer 212 has the lowest density of the first active material in the first section A1 positioned at the central portion of the electrode assembly 100 and the highest density of the first active material in the fourth section A4 positioned at the peripheral portion of the electrode assembly 100.

As shown in FIG. 7A, the first active material layer 212 has a lower density of the first active material in the first section A1 than in the second section A2, a lower density of the first active material in the second section A2 than in the third section A3, and a lower density of the first active material in the third section A3 than in the fourth section A4.

For example, the first active material layer 212 has a smaller concentration (or amount) of the first active material in the first section A1 than in the second section A2, a smaller concentration (or amount) of the first active material in the second section A2 than in the third section A3, and a smaller concentration (or amount) of the first active material in the third section A3 than in the fourth section A4, thereby making a density of the first active material in the first section A1 positioned at the central portion of the electrode assembly 100 lower than at the peripheral portion of the electrode assembly 100. In other words, the first active material layer 212 may be formed such that density of the first active material gradually increases from the central portion to the peripheral portion of the electrode assembly 100 by gradually increasing the concentration (or amount) of the first active material from the first section A1 to the fourth section A4. Here, in this embodiment, particle sizes of the first active material in the first section A1, the second section A2, the third section A3 and the fourth section A4 are all the same with each other (P1=P2=P3=P4). In addition, the first active material layer 212 may have a reduced density of the first active material in the central portion of the electrode assembly 100 by gradually increasing the concentration (or amount) of the conductive material and the binder from the fourth section A4 to the first section A1.

Additionally, the first active material layer 212 may further include a foaming agent, and a concentration (or amount) of the foaming agent in the first section A1 may be larger than that of the foaming agent in the fourth section A4. Here, in this embodiment, the foaming agent is used to form pores in the first active material layer 212. For example, in one embodiment, the first active material layer 212 has a larger amount of pores in the first section A1 than in the fourth section A4. That is to say, the first active material layer 212 includes the foaming agent throughout the first active material layer 212 from the first section A1 to the fourth section A4. The density of the first active material in each section can be adjusted by adjusting the concentration (or amount) of the foaming agent. In other words, the first active material layer 212 may have the lowest density of the first active material in the first section A1 by gradually reducing the concentration (or amount) of the foaming agent in the respective sections from the first section A1 to the fourth section A4.

In addition, as shown in FIG. 7B, in one embodiment, the first active material layer 212 is formed such that a particle size P1 of the first active material in the first section A1 is larger than a particle size P2 of the first active material in the second section A2, the particle size P2 of the first active material in the second section A2 is larger than a particle size P3 of the first active material in the third section A3, and the particle size P3 of the first active material in the third section A3 is larger than a particle size P4 of the first active material in the fourth section A4, thereby reducing the density of the first active material in the first section A1 positioned at the central portion of the electrode assembly 100.

As described above, in the electrode assembly 100 according to an embodiment of the present invention, an active material has a lower density at the central portion of the electrode assembly 100 than at the peripheral portion of the electrode assembly 100. Accordingly, the electrode assembly 100 according to an embodiment of the present invention can reduce a temperature surge at the central portion in which heat transfer efficiency is relatively low, and can improve safety of the electrode assembly 100 when heat is generated due to penetration or internal short circuit.

A secondary battery having the aforementioned electrode assembly will now be described.

Figure 8:
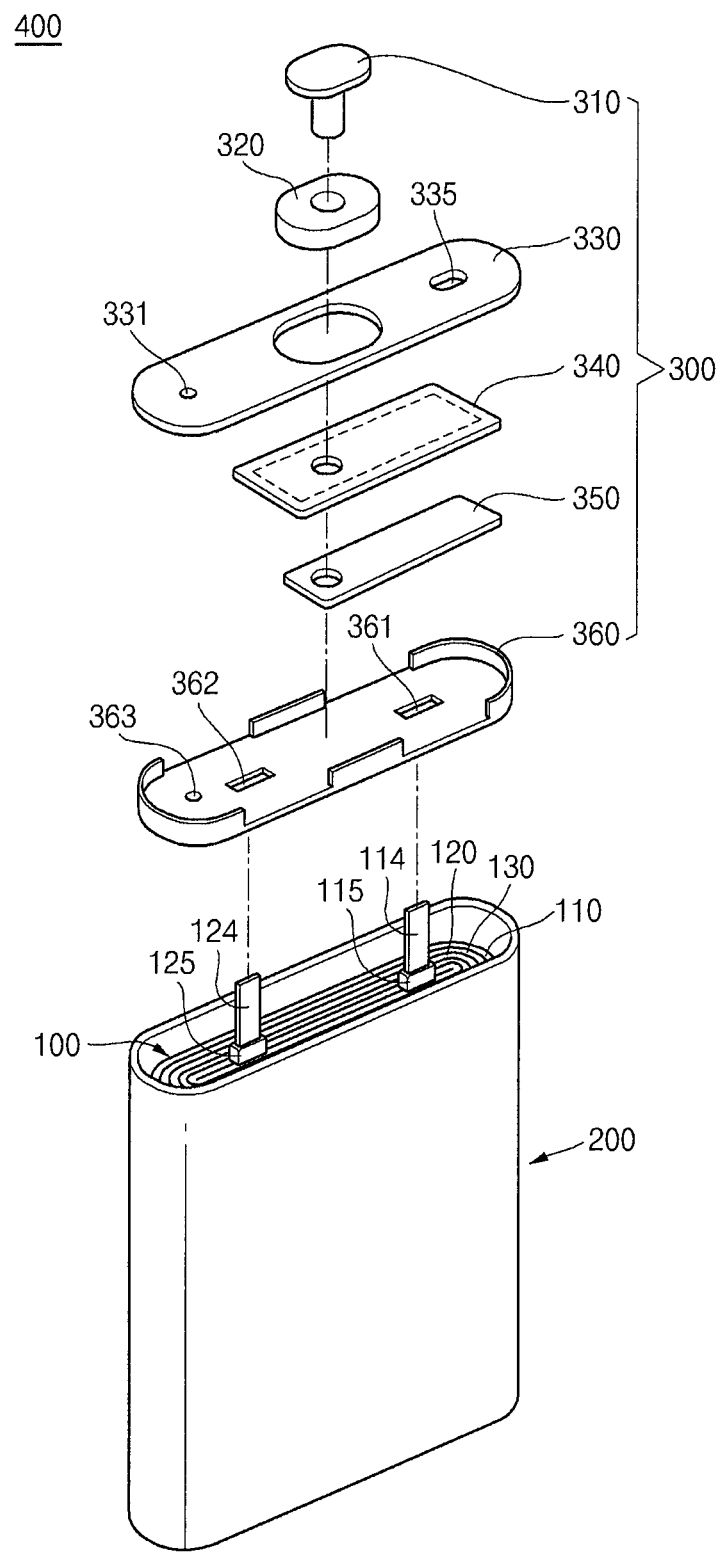
FIG. 8 is an exploded perspective view of a secondary battery having the electrode assembly shown in FIG. 1.

FIG. 8 is an exploded perspective view of a secondary battery having the electrode assembly shown in FIG. 1.

Referring to FIG. 8, the secondary battery 400 includes the electrode assembly 100, a case 200 and a cap assembly 300. The electrode assembly 100 has been described above and further detailed description thereof will be omitted.

The case 200 is made of a conductive metal such as aluminum, an aluminum alloy or nickel plated steel. The case 200 has a top end opening to allow the electrode assembly 100 to be inserted and placed and has a substantially hexahedral shape. In addition, the inner surface of the case 200 is insulated to be electrically insulated from the electrode assembly 100. Here, the case 200 may have a polarity. For example, the case 200 may function as a positive electrode. In addition, the present invention does not limit the shape of the case 200 to that illustrated herein, but the case 200 may have various shapes, including a pouch shape, a rectangular shape or a cylindrical shape.

The cap assembly 300 is positioned at a top portion of the electrode assembly 100 and is coupled to the opening of the case 200 to seal the case 200. The cap assembly 300 includes an electrode terminal 310, a gasket 320, a cap plate 330, an insulation plate 340, a terminal plate 350 and an insulation case 360. The gasket 320 is inserted into a portion between the electrode terminal 310 and the cap plate 330. The electrode terminal 310 and the terminal plate 350 are electrically connected to each other. The insulation plate 340 insulates the cap plate 330 from the terminal plate 350. An electrolyte injection hole 331 is formed at one side of the cap plate 330. A plug (not shown) is installed to seal the electrolyte injection hole 331 after an electrolyte is inserted through the electrolyte injection hole 331. In addition, a safety vent 335 is formed at the other side of the cap plate 330. The safety vent 335 is formed more thinly than the cap plate 330. When an internal pressure of the case 200 exceeds a predetermined (or preset) operating pressure of the safety vent 335, the safety vent 335 is opened to release gases. The insulation case 360 is formed in the opening of the case 200 to seal the case 200. The insulation case 360 is formed of an insulating polymer resin and may be made of polypropylene. Holes 361 and 362 are formed in the insulation case 360 to allow the first electrode tab 114 and the second electrode tab 124, respectively, to pass therethrough. In addition, an electrolyte passing hole 363 is formed in the insulation case 360 at a location corresponding to the electrolyte injection hole 331.

As described above, the secondary battery 400 according to an embodiment of the present invention includes the electrode assembly 100 having an active material having a lower density at the central portion of the electrode assembly 100 than at the peripheral portion of the electrode assembly 100, thereby improving safety of the secondary battery 400 when heat is generated due to penetration or internal short circuit.

While this invention has been described in connection with what is presently considered to be a practical exemplary embodiment of an electrode assembly and a secondary battery having the same, it is to be understood that the invention is not limited to the disclosed embodiments, but, rather is intended to cover various modifications and equivalent arrangements included within the spirit and scope of the appended claims, and equivalents thereof.

What is claimed is:

1. A secondary battery comprising:
an electrode assembly comprising:
a first electrode plate;
a second electrode plate; and
a separator between the first electrode plate and the second electrode plate wound together,
wherein the first electrode plate comprises a first electrode current collector and a first active material layer on the first electrode current collector, the first active material layer comprising a first active material, a binder and a conductive agent, and
wherein a portion of the first active material layer at a central portion of the electrode assembly comprises the first active material at a lower density than a density of the first active material at a portion of the first active material layer at a peripheral portion of the electrode assembly, and
wherein the portion of the first active material layer at the central portion of the electrode assembly and the portion of the first active material layer at the peripheral portion of the electrode assembly each have pores, the portion of the first active material layer at the central portion of the electrode assembly having a larger amount of the pores than the portion of the first active material layer at the peripheral portion of the electrode assembly, and wherein the pores are formed by a foaming agent, and
wherein the first active material layer has a leading edge positioned at one end of the first electrode plate, corresponding to the central portion of the electrode assembly, a terminal edge positioned at the other end of the first electrode plate, corresponding to the peripheral portion of the electrode assembly, and the density of the first active material of the first active material layer gradually increases from the leading edge to the terminal edge.

2. The secondary battery of claim 1, wherein the portion of the first active material layer at the central portion of the electrode assembly comprises the first active material at a smaller concentration than that of the portion of the first active material layer at the peripheral portion of the electrode assembly.

3. The secondary battery of claim 1, wherein the portion of the first active material layer at the central portion of the electrode assembly comprises a higher combined concentration of the binder and the conductive agent than that of the portion of the first active material layer at the peripheral portion of the electrode assembly.

4. The secondary battery of claim 1, wherein the first active material layer comprises a larger particle size of the first active material at the central portion of the electrode assembly than at the peripheral portion of the electrode assembly.

5. The secondary battery of claim 1, wherein the first active material layer is divided into a plurality of sections comprising a first section, a second section, a third section and a fourth section sequentially arranged from the central portion of the electrode assembly to the peripheral portion of the electrode assembly, and
wherein a density of the first active material in the first section is lower than a density of the first active material in the second section, the density of the first active material in the second section is lower than a density of the first active material in the third section, and the density of the first active material in the third section is lower than a density of the first active material in the fourth section.

6. The secondary battery of claim 5, wherein a concentration of the first active material in the first section is smaller than a concentration of the first active material in the second section, the concentration of the first active material in the second section is smaller than a concentration of the first active material in the third section, and the concentration of the first active material in the third section is smaller than a concentration of the first active material in the fourth section.

7. The secondary battery of claim 5, wherein a particle size of the first active material in the first section is larger than a particle size of the first active material in the second section, the particle size of the first active material in the second section is larger than a particle size of the first active material in the third section, and the particle size of the first active material in the third section is larger than a particle size of the first active material in the fourth section.

8. The secondary battery of claim 1, wherein the second electrode plate comprises a second electrode current collector and a second active material layer on at least one surface of the second electrode current collector, the second active material layer having a uniform thickness and comprising a second active material, a binder and a conductive agent, and
wherein the portion of the second active material layer at the central portion of the electrode assembly comprises the second active material at a lower density than a density of the second active material at the portion of the second active material layer at the peripheral portion of the electrode assembly.

9. The secondary battery of claim 8, wherein the second active material layer has a smaller concentration of the second active material at the central portion of the electrode assembly than a concentration of the second active material at the peripheral portion of the electrode assembly.

10. The secondary battery of claim 8, wherein the second active material layer has a higher combined concentration of the binder and the conductive agent at the central portion of the electrode assembly than a combined concentration of the binder and the conductive agent at the peripheral portion of the electrode assembly.

11. The secondary battery of claim 8, wherein the portion of the second active material layer at the central portion of the electrode assembly and the portion of the second active material layer at the peripheral portion of the electrode assembly each have pores, the portion of the second active material layer at the central portion of the electrode assembly having a larger amount of the pores than the portion of the second active material layer at the peripheral portion of the electrode assembly, and wherein the pores are formed by a foaming agent.

12. The secondary battery of claim 8, wherein the second active material layer comprises a larger particle size of the second active material at the central portion of the electrode assembly than at the peripheral portion of the electrode assembly.

13. The secondary battery of claim 8, wherein the second active material layer has a leading edge positioned at one end of the second electrode plate, corresponding to the central portion of the electrode assembly, and a terminal edge positioned at the other end of the second electrode plate, corresponding to the peripheral portion of the electrode assembly, and the density of the second active material of the second active material layer gradually increases from the leading edge to the terminal edge.

14. The secondary battery of claim 8, wherein the second active material layer is divided into a plurality of sections comprising a first section, a second section, a third section and a fourth section sequentially arranged from the central portion of the electrode assembly to the peripheral portion of the electrode assembly, and wherein a density of the second active material in the first section is lower than a density of the second active material contained in the second section, the density of the second active material in the second section is lower than a density of the second active material in the third section, and the density of the second active material in the third section is lower than a density of the second active material in the fourth section.

15. The secondary battery of claim 14, wherein a particle size of the second active material in the first section is larger than a particle size of the second active material in the second section, the particle size of the second active material in the second section is larger than a particle size of the second active material in the third section, and the particle size of the second active material in the third section is larger than a particle size of the second active material in the fourth section.

16. The secondary battery of claim 1, wherein the first active material layer comprises the foaming agent, and a concentration of the foaming agent at a leading edge is larger than a concentration of the foaming agent at a terminal edge.

17. The secondary battery of claim 11, wherein the first active material layer comprises the foaming agent, and a concentration of the foaming agent at a leading edge is larger than a concentration of the foaming agent at a terminal edge.

* * * * *